(12) United States Patent
Lakare

(10) Patent No.: US 8,160,367 B2
(45) Date of Patent: Apr. 17, 2012

(54) CIRCULAR INTENSITY DISTRIBUTION ANALYSIS FOR THE DETECTION OF CONVEX, CONCAVE AND FLAT SURFACES

(75) Inventor: Sarang Lakare, Chester Springs, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1121 days.

(21) Appl. No.: 12/018,496

(22) Filed: Jan. 23, 2008

(65) Prior Publication Data

US 2008/0211826 A1  Sep. 4, 2008

Related U.S. Application Data

(60) Provisional application No. 60/887,041, filed on Jan. 29, 2007.

(51) Int. Cl.
*G06K 9/00* (2006.01)
*G06K 9/46* (2006.01)

(52) U.S. Cl. ........ 382/199; 382/128; 382/131; 382/132; 382/181; 382/195; 382/203

(58) Field of Classification Search ................. 382/199, 382/128, 131, 132, 181, 195, 203
See application file for complete search history.

(56) References Cited

U.S. PATENT DOCUMENTS

| | | | | |
|---|---|---|---|---|
| 5,131,058 A * | 7/1992 | Ting et al. | | 382/162 |
| 5,289,374 A * | 2/1994 | Doi et al. | | 600/407 |
| 6,947,784 B2 * | 9/2005 | Zalis | | 600/425 |
| 7,006,693 B2 * | 2/2006 | Shibuya | | 382/191 |
| 7,043,064 B2 * | 5/2006 | Paik et al. | | 382/128 |
| 7,236,620 B1 * | 6/2007 | Gurcan | | 382/128 |
| 7,260,250 B2 * | 8/2007 | Summers et al. | | 382/128 |
| 2003/0156759 A1 * | 8/2003 | Colmenarez et al. | | 382/228 |
| 2005/0152588 A1 * | 7/2005 | Yoshida et al. | | 382/128 |
| 2005/0190969 A1 * | 9/2005 | Cathier et al. | | 382/199 |
| 2005/0286750 A1 * | 12/2005 | Dehmeshki | | 382/131 |
| 2006/0093217 A1 * | 5/2006 | Hong et al. | | 382/181 |

FOREIGN PATENT DOCUMENTS

| | | | |
|---|---|---|---|
| GB | 1 431 438 A | | 4/1976 |
| GB | 1431438 A | * | 4/1976 |

OTHER PUBLICATIONS

Zhang, et al. "Automatic Background Recognition and Removal (ABRR) in Computed Radiography Images." IEEE Transactions on Medical Imaging. 16.6 (1997): 762-771. Print.*
Hara, et al. "Topology-Adaptive Modeling of Objects by Using Variable-Size Ball Marching." Systems, Man, and Cybernetics, 2000 IEEE International Conference on . 3. (2000): 1598-1603. Print.*

(Continued)

*Primary Examiner* — Michael A Newman
(74) *Attorney, Agent, or Firm* — Peter Withstandley

(57) ABSTRACT

A method for characterizing a shape of an object surface includes acquiring image data including the object. The image data is analyzed at a locus of points that are at a predetermined distance from a point of interest proximate to the object surface to determine which of the locus of points represents a foreground and which of the locus of points represents a background. The shape of the object surface is characterized based on the characterization of the locus of points.

17 Claims, 5 Drawing Sheets

OTHER PUBLICATIONS

Hara et al. "Topology-Adaptive Modeling of Objects by Using Variable-Size Ball Marching." Systems, Man, and Cybernetics, 2000 IEEE International Conference on . 3. (2000): 1598-1603. Print.*

Zhang et al. "Automatic Background Recognition and Removal (ABRR) in Computed Radiography Images." IEEE Transactions on Medical Imaging. 16.6 (1997): 762-771. Print.*

Jurie, et al. "Scale-invariant Shape Features for Recognition of Object Categories." Computer Vision and Pattern Recognition, 2004. CVPR 2004. Proceedings of the 2004 IEEE Computer Society Conference on . 2. (2004): 90-96. Print.*

Hara et al., "Topology-adaptive modeling of objects by using variable-size ball marching", Systems, Man, and Cybernetics, 2000 IEEE International Conference on Nashville, TN, Oct. 8-11, 2000, vol. 3, pp. 1598-1603

D. Nain, "Scale-based decomposable shape representations for medical image segmentation and shape analysis", Dec. 2006, Georgia Institute of Technology, Chapter III, "Soft shape priors: vessel segmentation using a shape driven flow".

Hara et al., "Topology-adaptive modeling of objects by using variable-size ball marching", Systems, Man, and Cybernetics, 2000 IEEE International Conference on Nashville, TN, USA Oct. 8-11, 2000, vol. 3, pp. 1598-1603.

Nain, "Scale-based decomposable shape representations for medical image segmentation and shape analysis", Dec. 2006, Georgia Institute of Technology, Chapter III, "Soft shape priors: vessel segmentation using a shape driven flow", pp. 49-65.

International Search Report including Notification of Transmittal of the International Search Report, International Search Report, and Written Opinion of the International Searching Authority.

* cited by examiner

CIRCULAR INTENSITY DISTRIBUTION ANALYSIS FOR THE DETECTION OF CONVEX, CONCAVE AND FLAT SURFACES

CROSS-REFERENCE TO RELATED APPLICATION

The present application is based on provisional application Ser. No. 60/887,041, filed Jan. 29, 2007, the entire contents of which are herein incorporated by reference.

BACKGROUND OF THE INVENTION

1. Technical Field

The present disclosure relates to image detection and, more specifically, to circular intensity distribution analysis for the detection of convex, concave and flat surfaces.

2. Discussion of the Related Art

Computer vision is the technical field of using computers to interpret visual data such as two and three-dimensional images. Computer vision techniques may be instrumental in interpreting medical images, for example, to perform computer assisted diagnosis (CAD).

Traditional approaches to interpreting medical images, such as magnetic resonance images (MRI) and computer tomography (CT) images involve the acquisition of image data using a medical image device, for example, an MRI or a CT scanner. The acquired medical image data may then be rendered into a three-dimensional volume. A trained medical practitioner, for example, a radiologist, may then analyze the volume image, for example, over a series of consecutive two-dimensional volume slices, to detect the presence of disease or injury.

In the healthcare industry, however, there is increasing pressure to reduce the expense of medical image analysis while increasing efficacy. Accordingly, the medical practitioner must be able more accurately diagnose disease and injury in only a small amount of time.

By using CAD techniques to analyze medical image, disease and injury may be more accurately diagnosed in less time than when using traditional manual approaches. When using CAD techniques, one or more regions of interest may be automatically highlighted, or otherwise identified, for the benefit of the medical practitioner who ultimately renders a diagnosis.

In contributing to such a diagnosis, it is often useful to characterize the shape of an object. By characterizing the object's shape, important insights into the nature of the shape may be obtained. For example, it is particularly beneficial to characterize a shape of a potentially curved object as either concave, convex or flat.

One approach to characterizing the shape of a surface of the object is to match the surface in question against one or more geometric primitives. In this way, parametric descriptions of the surfaces may be achieved. The geometric primitives may each be compared to the surface in question and the residual of the fitting may be analyzed. For example, a curve fitting approach may be taken to find a curvature that best fits the surface in question. Other approaches may use curvature to identify the loci where the mean or Gaussian curvature indicates a peak, and the surface in question may be mapped to the Gaussian sphere.

When analyzing synthetic structures, geometric contours may be fit to one or more primitives with relative ease. This is because synthetic structures may have prominent features and strong geometric definition. However, when analyzing anatomical structures, such approximations may be substantially more difficult and surface noise may become a large factor in segmentation.

SUMMARY

A method for characterizing a shape of an object surface includes acquiring image data including the object. The image data is analyzed at a locus of points that are at a predetermined distance from a point of interest proximate to the object surface to determine which of the locus of points represents a foreground and which of the locus of points represents a background. The shape of the object surface is characterized based on the characterization of the locus of points.

A longest continuous set of background points within the locus may be determined and a longest continuous set of foreground points within the locus may be determined. These determinations may be based on the analysis of the image data. The shape of the object surface may be characterized as convex, concave or flat based on the relative size of the determined longest continuous set of background points and the determined longest continuous set of foreground points.

A ratio of the size of the longest continuous set of background points and the longest continuous set of foreground points may be calculated and the shape of the object surface may be characterized as convex when the ratio is substantially greater than 1, concave when the ratio is substantially less than 1, and flat when the ratio is substantially equal to 1.

The image data may be two-dimensional image data and the locus of points that are at a predetermined distance from the point of interest may comprise a circle. Alternatively, the image data may be three-dimensional image data and the locus of points that are at a predetermined distance from the point of interest may comprise a sphere.

The point of interest may be a point substantially on the object surface. The point of interest may be manually identified. The point of interest may be automatically identified.

The predetermined distance from the point of interest may be a predetermined radius. The image data may be analyzed at multiple locus of points that are at multiple radius from the same point of interest. The determination of which of the locus of points represents the foreground and which of the locus of points represents the background may be made for each of the multiple locus of points. The characterization of the shape of the object surface may be based on the characterization of each of the multiple locus of points.

A point may be determined to represent foreground or background according to its intensity distribution. A point may be determined to represent foreground if it has a background possibility less than 50% and may be determined to represent background if it has a background possibility greater than 50%.

A system for characterizing a shape of an object surface includes an image acquisition unit for acquiring image data. A definition acquisition unit acquires definitions for a foreground portion of the image data that includes the object and a background portion of the image data that does not include the object surface. An analyzing unit analyzes the image data at a locus of points that are at a predetermined distance from a point of interest proximate to the object surface to determine which of the locus of points represents a foreground and which of the locus of points represents a background in accordance with the acquired definitions. A characterization unit characterizes the shape of the object surface based on the characterization of the locus of points.

The characterization unit may determine a longest continuous set of background points within the locus and a longest continuous set of foreground points within the locus, based on the analysis of the image data. The shape of the object surface may be characterized as convex, concave or flat based on the relative size of the determined longest continuous set of background points and the determined longest continuous set of foreground points.

The characterization unit may calculate a ratio of the size of the longest continuous set of background points and the longest continuous set of foreground points and may characterize the shape of the object surface as convex when the ratio is substantially greater than 1, concave when the ratio is substantially less than 1, and flat when the ratio is substantially equal to 1.

A computer system includes a processor and a program storage device readable by the computer system, embodying a program of instructions executable by the processor to perform method steps for characterizing a shape of an object surface. The method includes acquiring image data including the object, analyzing the image data at a locus of points that are at a predetermined distance from a point of interest proximate to the object surface to determine which of the locus of points represents a foreground and which of the locus of points represents a background, and characterizing the shape of the object surface based on the characterization of the locus of points.

The step of characterizing the shape of an object surface based on the characterization of the locus of points may include determining a longest continuous set of background points within the locus and a longest continuous set of foreground points within the locus, based on the analysis of the image data, and characterizing the shape of the object surface as convex, concave or flat based on the relative size of the determined longest continuous set of background points and the determined longest continuous set of foreground points.

The step of characterizing the shape of the object surface as convex, concave or flat may include calculating a ratio of the size of the longest continuous set of background points and the longest continuous set of foreground points and characterizing the shape of the object surface as convex when the ratio is substantially greater than 1, concave when the ratio is substantially less than 1, and flat when the ratio is substantially equal to 1.

The image data may be analyzed at multiple locus of points that are at multiple radius from the same point of interest. The determination of which of the locus of points represents the foreground and which of the locus of points represents the background may be made for each of the multiple locus of points. The characterization of the shape of the object surface may be based on the characterization of each of the multiple locus of points.

A point may be determined to represent foreground or background according to its intensity distribution.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
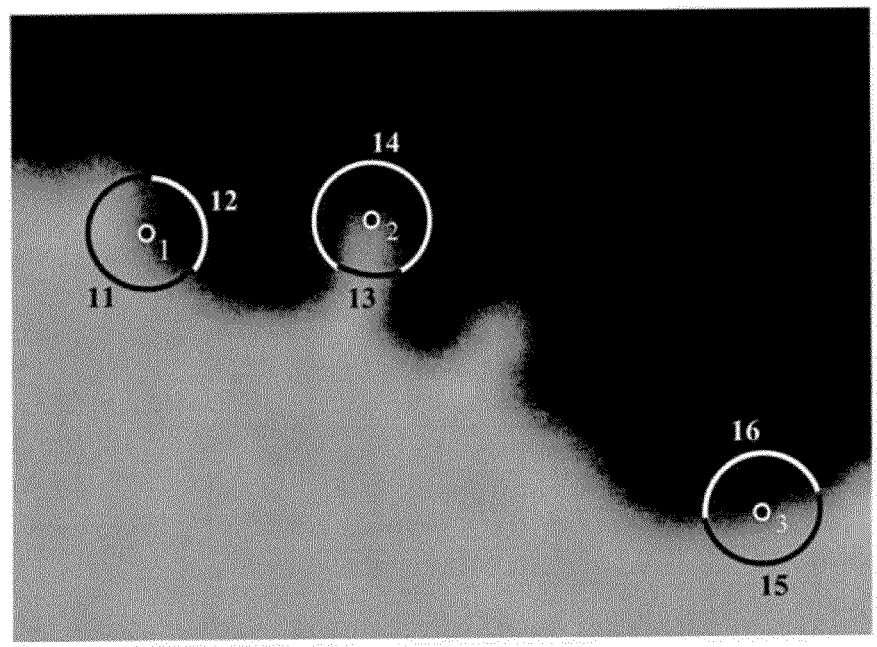
FIG. 1 is an image illustrating an object surface that is characterized as either convex, concave or flat according to intensity distribution according to an exemplary embodiment of the present invention.

In describing the exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention may analyze volumetric data to characterize a surface of an object as either convex, concave or flat. Curvature information need not be directly calculated and the surface need not be fit to a curve or another geometric primitive. Instead, the intensity distribution of the neighborhood of the surface may be analyzed to perform this determination.

FIG. 1 illustrates an object surface that is characterized as either convex, concave or flat according to intensity distribution according to an exemplary embodiment of the present invention. The image data includes a foreground area (in grey) and a background area (in black). Here, the image data is two-dimensional. The image data may also be three-dimensional; however, two-dimensional image data is illustrated for the purposes of simplifying the description. The indication of what portion of the image is foreground and what portion of the image is background may be predetermined, for example, by segmentation.

Points 1, 2 and 3, within the image data, represent three points of interest. Points of interest may be either automatically detected, for example, using image segmentation techniques, or the points of interest may be manually selected, for example, by a medical practitioner such as a radiologist.

After the points of interest have been selected, a circle may be conceptualized around each point of interest. The circle may have a radius r. The radius r may be selected according to the size of the surface feature being examined. For example, the radius r may be large for large surface features and the radius r may be small for small surface features. Alternatively, the radius r may be a fixed predetermined value.

Each point of interest may be expressed as a set of coordinates, for example (a, b). Thus, the equations representing the circle, expressed in polar coordinates, may be:

$$x = a + r \cos(t)$$
$$y = b + r \sin(t) \qquad (1)$$

Here, $t \in [0, 2\pi)$.

When dealing with a three-dimensional image however, points of interest may be three-dimensional, and a sphere of radius r may be conceptualized about each point. Equation (1) may be replaced by the corresponding equation for a sphere in the spherical coordinate system:

$$x = a + r\cos(t)\sin(u)$$

$$y = b + r\sin(t)\sin(u)$$

$$z = c + r\cos(u) \quad (2)$$

Here, $t \in [0, 2\pi)$ and $u \in [0, \pi)$.

Next, each circle (in the two-dimensional embodiment) may be broken up into foreground sections and background sections. The foreground sections are those parts of the circumference of the circle that overlap the foreground area while the background sections are those parts of the circumference of the circle that overlap the background area. Because of the nature of image data, however, it may be difficult to differentiate between foreground and background. Each image pixel may have a corresponding background probability that represents the extent to which that pixel may be in the background. For example, a pixel having a background probability of 100% is clearly within the background while a pixel having a background probability of 0% is clearly in the foreground. For these purposes, pixels may be considered background if they have a background probability greater than 50%. Accordingly, the circumference of the circle may be calculated pixel-by-pixel, and for each pixel, it may be determined whether the pixel is foreground or background depending upon its background probability. Accordingly, the circle may be divided into foreground and background portions depending on the characterization of the pixels that are covered by the circle.

Referring to FIG. 1, for a point of interest 1, section 11 represents the foreground portion of the circumference $C_f$ while section 12 represents the background portion of the circumference $C_b$. Similarly, for point of interest 2, section 13 represents the foreground portion of circumference $C_f$ while section 14 represents the background portion of the circumference $C_b$. For point of interest 3, section 15 represents the foreground portion of the circumference $C_f$ while section 16 represents the background portion of the circumference $C_b$.

Then, for each point of interest, a ratio $\lambda$ may be calculated representing the proportion of background circumference to foreground circumference. Thus:

$$\lambda = \frac{C_b}{C_f} \quad (3)$$

The higher the ratio $\lambda$ is, the greater the concavity of the region at the point of interest. Accordingly, a low value for $\lambda$ indicates a convex region, a high value for $\lambda$ indicates a concave region, and a value of $\lambda$ close to 1 indicates a flat region.

Depending upon the image surface in question, the background circumference and/or the foreground circumference may not be fully continuous. Such embodiments are described in detail below with reference to FIG. 3.

To increase processing efficiency, the pixels of the circle need not be actual image pixels, the image data may be sampled on a grid. Points on the circle may then be approximated by grid points. The average intensity on each grid point may be calculated and that average intensity may be used to characterize the corresponding grid point as either foreground or background.

Exemplary embodiments of the present invention are not limited to the characterization of two-dimensional image surfaces, three-dimensional image surfaces may be characterized as well. According to one exemplary approach to characterizing three-dimensional image surfaces as either convex, concave or flat, the approach discussed above may be applied to arbitrary two-dimensional planes that intersect the three-dimensional image surface. For example, the image volume may be divided into a set of two dimensional slices separated by a predetermined unit of distance. For each image slice, the above described method may be applied. However; $\lambda$ may be calculated as the maximum value of $C_b$ across all slices over the maximum value of $C_f$ across all slices.

According to another approach to characterizing three-dimensional image surfaces, intensity analysis may be applied along a spherical surface rather than a circumference. A spherical coordinate system may be used rather than polar coordinates. Thus $\lambda$ may be defined as a ratio of a background spherical surface over a foreground spherical surface.

Figure 2:
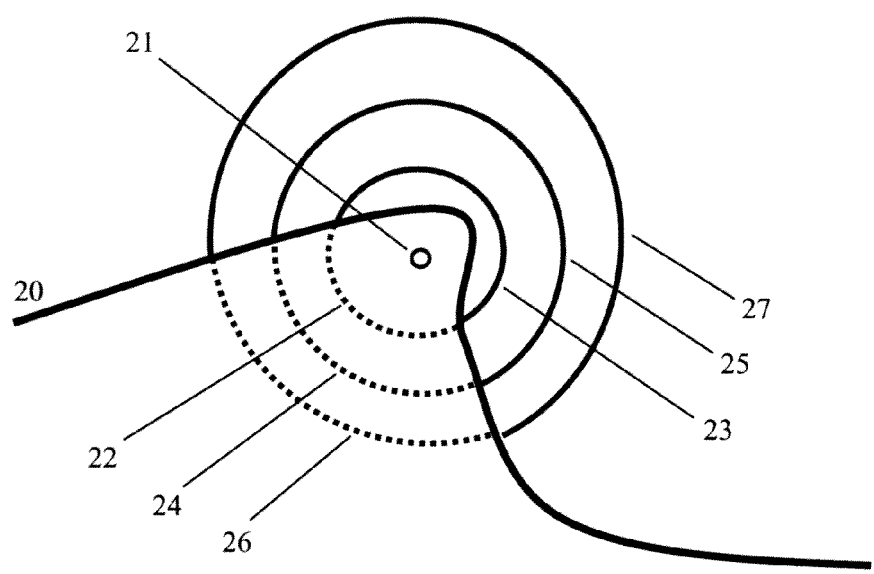
FIG. 2 is a diagram illustrating a characterization of an image surface segment using multiple circumferences according to an exemplary embodiment of the present invention.

FIG. 2 is a diagram illustrating a characterization of an image surface segment using multiple circumferences according to an exemplary embodiment of the present invention. In this example, an image surface segment 20 may be characterized as either convex, concave or flat based on multiple concentric circumferences (or spheres). As in the example above, here a point of interest (center point 21) is defined. Multiple concentric circles may then be conceptualized, each having its own radius $r_1, r_2, \ldots r_n$. Each circumference may be divided into at least one foreground section and background section. A first circumference $C_1$ includes a first foreground circumference section $C_{f1}$ 22 and a first background circumference section $C_{b1}$ 23. A second circumference $C_2$ includes a second foreground circumference section $C_{f2}$ 24 and a second background circumference section $C_{b2}$ 25. A third circumference $C_3$ includes a third foreground circumference section $C_{f3}$ 26 and a third background circumference section $C_{b3}$ 27. There may be any number of circumferences $C_1$-$C_n$ corresponding to the radiuses $r_1$-$r_n$. For each circumference, $C_n$, a $\lambda_n$ may be calculated according to:

$$\lambda_n = C_{bn}/C_{fn}.$$

One or more of the multiple ratios $\lambda_1, \lambda_2, \ldots \lambda_n$ may be used to characterize the image surface segment as either convex, concave or flat. This may be accomplished in any number of ways, for example, the most frequently occurring characterization (mode) may be selected or an average (mean) $\lambda$ may be calculated from an average $C_b$ and an average $C_f$. Alternatively, outliers such as very small r and very large r may be disregarded if they appear to be unstable (i.e. small changes in r lead to very different $\lambda$) or if they appear to be inconsistent with the result of the majority of other $\lambda$ values. Other possible treatments may be contemplated as well.

Figure 3:
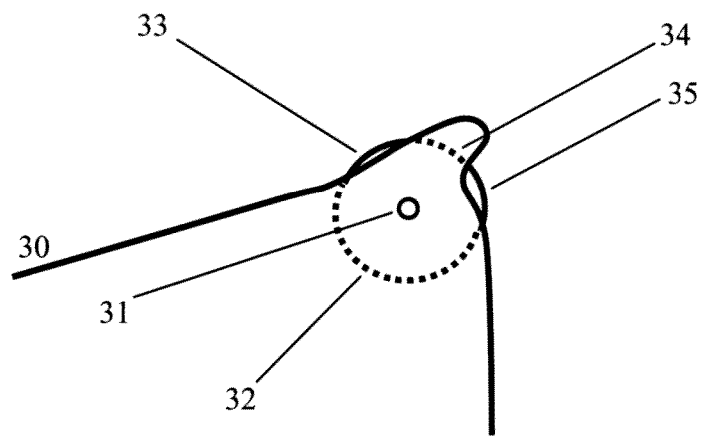
FIG. 3 is a diagram illustrating a characterization of an image surface segment with discontinuous circumference according to an exemplary embodiment of the present invention.

As discussed above, depending upon the image surface in question, the background circumference and/or the foreground circumference may not be fully continuous. This may be true of either the two-dimensional examples or the three-dimensional examples described above. FIG. 3 is a diagram illustrating a characterization of an image surface segment with discontinuous circumference according to an exemplary embodiment of the present invention. Here an image surface segment 30 is shown.

A point of interest (center point 31) is determined. A circle is conceptualized around the center point 31 having a radius r. In this example, the circumference of the circle includes multiple discontinuous foreground and background sections. As shown, the circumference includes a first foreground section 32, a first background section 33, a second foreground section 34 and a second background section 35.

When there are multiple discontinuous sections, as shown, $\lambda$ may be calculated from a circumference section $C_b$ that is defined as the longest continuous background section, here corresponding to 33. The circumference section $C_f$ may similarly be defined as the longest continuous foreground section, here corresponding to 32.

This approach for the treatment of multiple discontinuous sections is presented as an exemplary approach, and other alternative treatments may be possible. For example, the discontinuous sections may be added together, for example, $C_b$ may be defined as the sum of the lengths of each of the discontinuous background sections while $C_f$ may be defined as the sum of the lengths of each of the discontinuous foreground sections.

Figure 4:
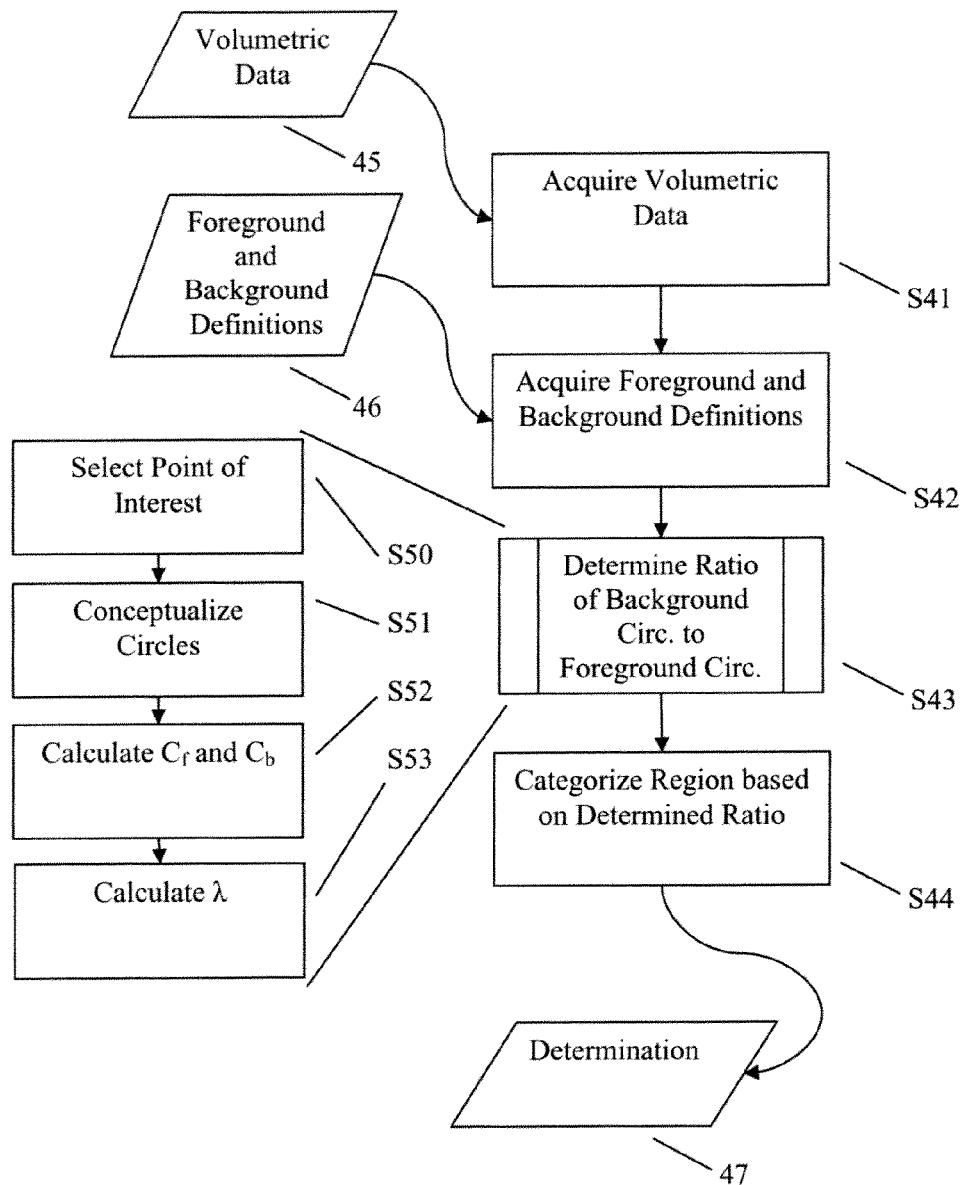
FIG. 4 is a flow chart illustrating a method for performing circular intensity distribution analysis for the detection of convex, concave and flat surfaces according to an exemplary embodiment of the present invention.

FIG. 4 is a flow chart illustrating a method for performing circular intensity distribution analysis for the detection of convex, concave and flat surfaces according to an exemplary embodiment of the present invention. Image data 45 may be acquired (Step S41). Image data may either be two-dimensional image data or three-dimensional volume data. The image data may include an intensity distribution representing one or more object surfaces and their surrounding neighborhoods. Image data may be acquired using a medical imaging device such as a CT scanner and/or an MRI. Other medical imaging devices may also be used, such as positron emission tomography (PET) scanners, ultrasounds imagers, conventional x-ray imagers and the like. Captured image data may be directly categorized according to the techniques discussed herein or captured images may be stored in a medical image repository such as a database system and medical images may be acquired from the repository for processing.

The object surface may be defined as a foreground while the surrounding areas not part of the object surface may be defined as a background. Information defining the foreground area and the background area 46 may also be acquired (Step S42). As described above, the determination of what area is foreground and what area is background may be pre-performed, for example, by an automated approach for segmentation.

Next, a ratio of background circumference to foreground circumference for each of the one or more conceptualized circles may be calculated (Step S43). This step may be include selecting one or more points of interest (Step S50), conceptualizing the one or more circles about corresponding points of interest based on one or more corresponding radiuses r (Step S51), calculating $C_f$ and $C_b$, for example, as described above (Step S52), and calculating $\lambda$ based on the calculated $C_f$ and $C_b$, for example, as described above (Step S53).

Finally, the image surface segments may each be categorized based on the respective ratios $\lambda$, for example, as described above (Step S44). This may result in the generation of one or more determinations 47 for whether the image surface segments are convex, concave or flat.

Figure 5:
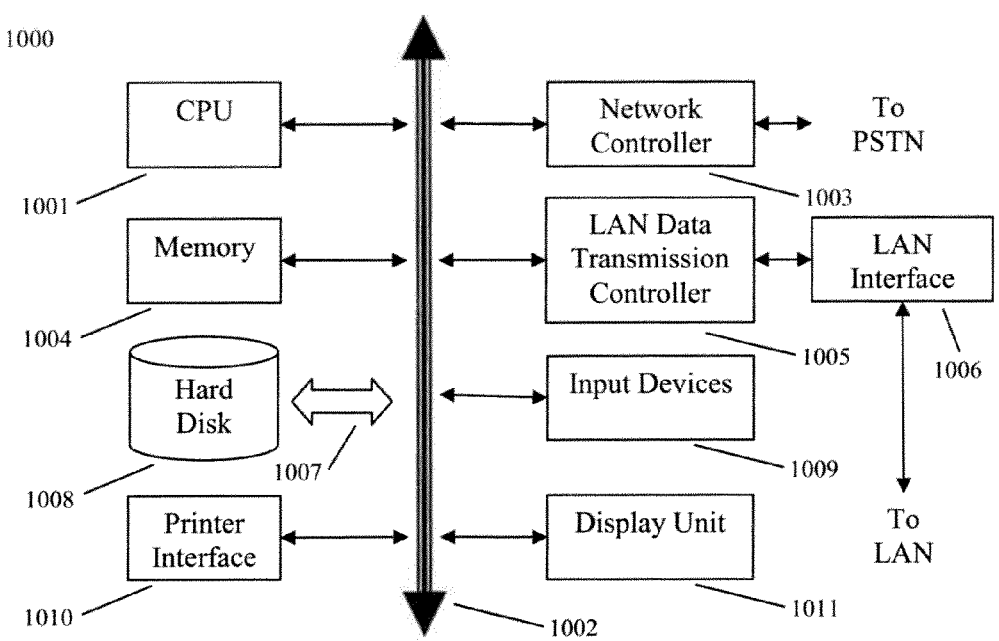
FIG. 5 shows an example of a computer system capable of implementing the method and apparatus according to embodiments of the present disclosure.

FIG. 5 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The above specific exemplary embodiments are illustrative, and many variations can be introduced on these embodiments without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for characterizing a shape of an object surface, comprising:
acquiring image data including the object;
analyzing the image data at a locus of points that are at a predetermined distance from a point of interest proximate to the object surface to determine which of the locus of points represents a foreground and which of the locus of points represents a background; and
characterizing the shape of the object surface based on the characterization of the locus of points, wherein the step of characterizing the shape of an object surface based on the characterization of the locus of points includes:
determining a longest continuous set of background points along the locus and a longest continuous set of foreground points along the locus, based on the analysis of the image data; and
characterizing the shape of the object surface as convex, concave or flat based on the relative size of the determined longest continuous set of background points and the determined longest continuous set of foreground points.

2. The method of claim 1, wherein the step of characterizing the shape of the object surface as convex, concave or flat includes calculating a ratio of the size of the longest continuous set of background points and the longest continuous set of foreground points and characterizing the shape of the object surface as:
convex when the ratio is substantially greater than 1;
concave when the ratio is substantially less than 1; and
flat when the ratio is substantially equal to 1.

3. The method of claim 1, wherein the image data is two-dimensional image data and the locus of points that are at a predetermined distance from the point of interest comprise a circle.

4. The method of claim 1, wherein the image data is three-dimensional image data and the locus of points that are at a predetermined distance from the point of interest comprise a sphere.

5. The method of claim 1, wherein the point of interest is a point substantially on the object surface.

6. The method of claim 5, wherein the point of interest is manually identified.

7. The method of claim 5, wherein the point of interest is automatically identified.

8. The method of claim 1, wherein the predetermined distance from a point of interest is a predetermined radius.

9. The method of claim 8, wherein:
the image data is analyzed at multiple locus of points that are at multiple radius from the same point of interest;
the determination of which of the locus of points represents the foreground and which of the locus of points represents the background is made for each of the multiple locus of points; and
the characterization of the shape of the object surface is based on the characterization of each of the multiple locus of points.

10. The method of claim 1, wherein a point is determined to represent foreground or background according to its intensity distribution.

11. The method of claim 1, wherein a point is determined to represent foreground if it has a background possibility less than 50% and is determined to represent background if it has a background possibility greater than 50%.

12. A system for characterizing a shape of an object surface, comprising:
an image acquisition unit for acquiring image data;
a definition acquisition unit for acquiring definitions for a foreground portion of the image data that includes the object and a background portion of the image data that does not include the object surface;
an analyzing unit for analyzing the image data at a locus of points that are at a predetermined distance from a point of interest proximate to the object surface to determine which of the locus of points represents a foreground and which of the locus of points represents a background in accordance with the acquired definitions; and
a characterization unit for characterizing the shape of the object surface based on the characterization of the locus of points, wherein the characterization unit determines a longest continuous set of background points along the locus and a longest continuous set of foreground points along the locus, based on the analysis of the image data, and characterizes the shape of the object surface as convex, concave or flat based on the relative size of the determined longest continuous set of background points and the determined longest continuous set of foreground points.

13. The system of claim 12, wherein the characterization unit calculates a ratio of the size of the longest continuous set of background points and the longest continuous set of foreground points and characterizes the shape of the object surface as:
convex when the ratio is substantially greater than 1;
concave when the ratio is substantially less than 1; and
flat when the ratio is substantially equal to 1.

14. A computer system comprising:
a processor; and
a program storage device readable by the computer system, embodying a program of instructions executable by the processor to perform method steps for characterizing a shape of an object surface, the method comprising:
acquiring image data including the object;
analyzing the image data at a locus of points that are at a predetermined distance from a point of interest proximate to the object surface to determine which of the locus of points represents a foreground and which of the locus of points represents a background; and
characterizing the shape of the object surface based on the characterization of the locus of points, wherein the step of characterizing the shape of an object surface based on the characterization of the locus of points includes:
determining a longest continuous set of background points along the locus and a longest continuous set of foreground points along the locus, based on the analysis of the image data; and
characterizing the shape of the object surface as convex, concave or flat based on the relative size of the determined longest continuous set of background points and the determined longest continuous set of foreground points.

15. The computer system of claim 14, wherein the step of characterizing the shape of the object surface as convex, concave or flat includes calculating a ratio of the size of the longest continuous set of background points and the longest continuous set of foreground points and characterizing the shape of the object surface as:
convex when the ratio is substantially greater than 1;
concave when the ratio is substantially less than 1; and
flat when the ratio is substantially equal to 1.

16. The computer system of claim 14, wherein:
the image data is analyzed at multiple locus of points that are at multiple radius from the same point of interest;
the determination of which of the locus of points represents the foreground and which of the locus of points represents the background is made for each of the multiple locus of points; and
the characterization of the shape of the object surface is based on the characterization of each of the multiple locus of points.

17. The computer system of claim 14, wherein a point is determined to represent foreground or background according to its intensity distribution.

* * * * *